Patented Oct. 13, 1942

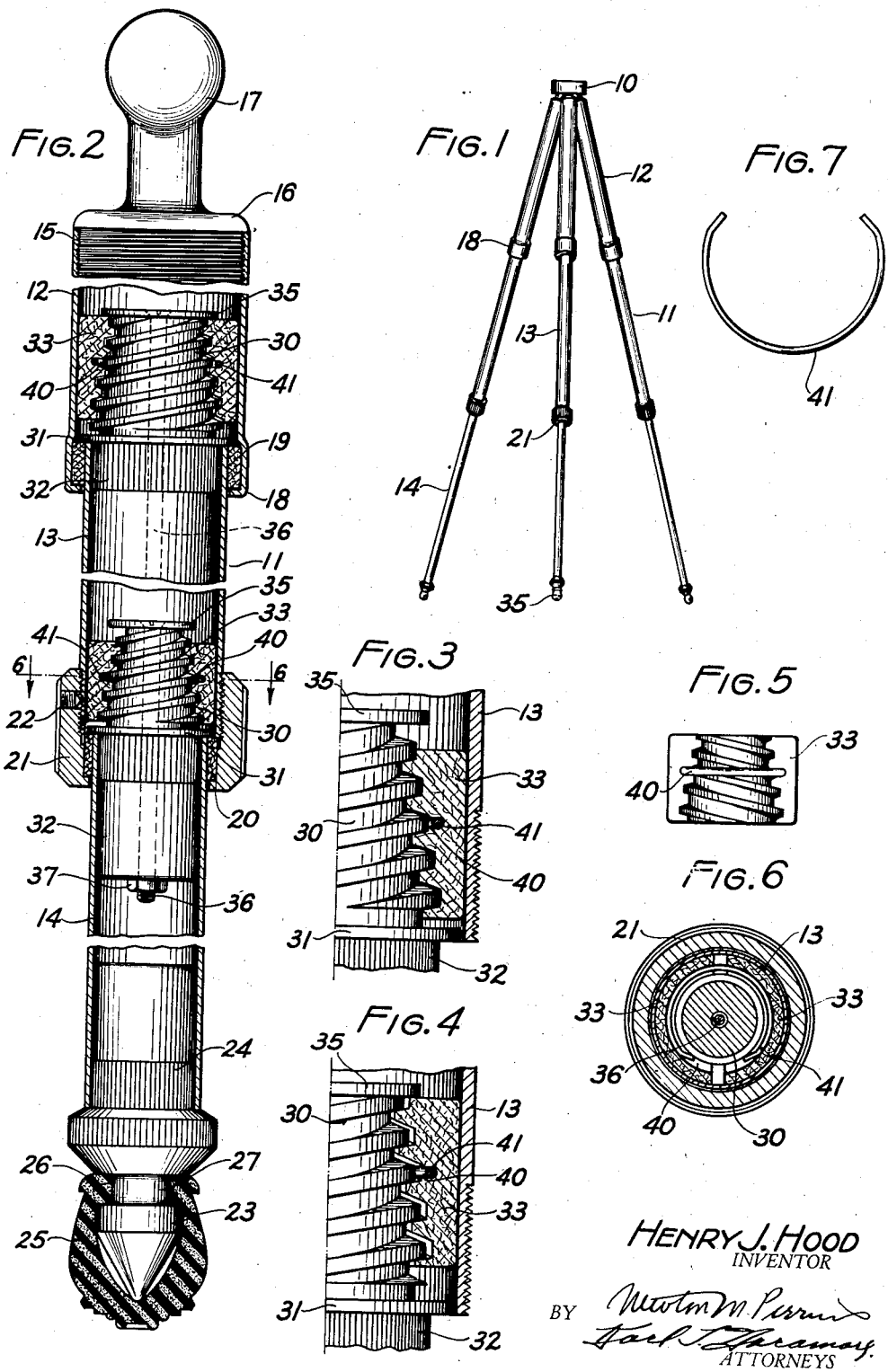

2,298,380

UNITED STATES PATENT OFFICE 2,298,380

TRIPOD LEG AND CLAMPING MEANS THEREFOR

Henry J. Hood, Rochester, N. Y., assignor to Eastman Kodak Company, Rochester, N. Y., a corporation of New Jersey Application March 12, 1941, Serial No. 382,973

6 Claims. (Cl. 248—191)

The present invention relates to extensible tripod legs, and particularly to a leg construction comprising telescopic tubes and a clamping means for readily locking them in various relative positions of extension.

It has been previously proposed to provide a clamping arrangement for tripod legs, comprising telescopic cylindrical tubes, which arrangement includes a clamp member operated upon relative rotation of the cylindrical tubes to clamp the tubes with respect to each other in any desired axial relation. The formerly proposed clamp member includes a split-nut and a tapered member for spreading the nut against the inner walls of one of the tubes. The clamp member is operated by relative rotation between one of the tubes and the split-nut, and, since the nut and the tube engaged by it are of circular cross section, prohibition of relative rotatable movement between these members depends solely upon a frictional engagement between the inner walls of the tube and the outer surface of the split-nut. In these previously proposed arrangements the split-nut has not been effectively held against rotation during rotation of the tapered member with the result that the clamping action fails to take effect immediately upon rotation of the inner leg member. This disadvantage has been overcome by making the engaging surfaces of the split-nut and the inner wall of the leg member engaged thereby non-circular in shape so as to positively prevent relative rotation of the two; but the cost of a polygonal tube for a tripod leg is prohibitive to its use in a reasonably priced tripod. Further, in these previously mentioned clamping arrangements wherein the split-nut is spread by a tapered member, engagement between the tapered member and nut has been over a very restricted area of the split-nut, as distinguished from an engagement throughout the length of the nut, so that the full length of the nut is not forced against the inner wall of the leg member to give the maximum frictional clamping action possible. In addition, these previously proposed clamping arrangements did not provide for a normal friction between the split-nut and the inner wall of the outer leg section to prevent an uncontrolled extension of the leg sections when the same were in an unclamped condition.

Therefore, one object of the present invention is the provision in a tripod leg construction, comprising telescopic tubes, of a clamping means which will frictionally clamp the leg sections the instant one leg section is rotated relative to the other in a given direction.

Another object is to provide a clamping means of the type set forth which normally holds the tripod leg sections against uncontrolled longitudinal movement even when in an unclamped condition.

Another object is to provide a clamping means which will become effective immediately upon rotation of one leg member relative to the other even though there is no engagement between the clamping means and the leg sections frictionally engaged thereby positively preventing relative rotation of the two.

Still another object is to provide a clamping means of the type set forth which provides for a greater frictional engagement between a member thereof and the leg member engaged thereby with a given mannual effort than possible with previously proposed arrangements, with the result that a more effective clamping action is obtainable between the telescoping sections of the tripod legs.

A further object is to provide a clamping means of the type set forth which comprises a conical screw fixed to one leg member and threadably engaged by a plurality of threaded arcuate sections surrounding the same and confined between the screw and the inner wall of the other leg member.

And yet another object is to provide a clamping means of the type set forth which is cheap to manufacture, easy to assemble, and more efficient in use than similar clamping arrangements heretofore proposed.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is an elevational view of a complete tripod having adjustable legs constructed in accordance with the present invention.

Fig. 2 is an enlarged sectional view of an extensible tripod leg having a clamping means constructed in accordance with the preferred embodiment of the present invention, Fig. 3 is an enlarged sectional view of one half of the clamping means, and showing the conical screw turned up to a leg clamping position, Fig. 4 is a view similar to Fig. 3, but showing the conical screw retracted to an unclamping position, Fig. 5 is an elevational view of one of the arcuate sections forming a part of the split clamping member, or nut, Fig. 6 is a sectional view taken substantially on line 6—6 of Fig. 2, and Fig. 7 is a view of the expander spring which is adapted to be located in grooves in the clamping members for normally spreading them apart.

Like reference characters refer to corresponding parts throughout the drawing.

Referring now to the drawing, the tripod as a whole may comprise a head 10 on which a camera is adapted to be mounted in any well-known manner, and from the under side of which extend three extensible tripod legs 11. These legs each have a ball 17 attached to the upper end which may be pivoted in the tripod head 10 in any known manner, such for instance as shown in U. S. Patent 606,022, Patchel, June 21, 1898. While I have shown the tripod legs 11 composed of three extensible telescopic sections, it will be readily understood that such legs could be made of two or more such extensible sections just as well as not.

Referring now to Figs. 2-7, the tripod leg and a clamping means therefor constituting the present invention will now be described. As shown in Fig. 2, each tripod leg 11 comprises three tubular sections 12, 13, and 14 in telescopic relation. The upper section 12 is the largest in diameter and has its upper end internally threaded, as shown at 15, to threadedly receive the threaded shank 16 on the lower end of the ball member 17. The lower end of the upper leg section 12 is spun out and turned in as indicated at 18 to position a bushing 19 within which the intermediate leg section 13 telescopes. The bushing 19 may be made of any suitable material which will permit a free telescoping action of the leg section 13 relative to the same without undue wear, but should be fairly rigid because it acts as a positive stop to prevent the leg section 13 from being pulled out of leg section 12 as will be hereinafter set forth. I have found that a plastic material, such as Tenite, Bakelite, etc. makes a suitable bushing.

The lower leg section 14 telescopes into the lower end of leg section 13 and consequently must be of smaller diameter than the leg section 13. The lower leg section 14 is in slidable engagement with a bushing 20 similar to bushing 19 just described and for the same reason. This bushing 20, however, is held in position by a collar 21 threaded onto the lower end of the leg section 13 and held by a setscrew 22, the difference in the mounting structure for the two bushings being due to the necessity of assembling the leg sections in telescoping arrangement as will be obvious. A metal foot 23 may be fixed to the lower end of the leg section 14 by a shank 24 thereon having a drive fit with the interior of the tube as shown. The pointed end of the metal foot may be covered with a rubber foot 25 if desired, said rubber foot being cup-shaped and having an inwardly extending flange 26 which is adapted to snap into the annular groove 27 in the metal foot to hold the rubber foot in place.

Coming now to the means for clamping the leg sections against longitudinal extensions, and which means constitutes the present invention, it will be readily appreciated that there must be a clamping means between each two relatively movable sections, or two clamping means for a leg composed of three sections as shown. The clamping means for each two relatively movable leg sections will differ from one another only in the size of the parts going to make up the clamping means, the difference in size being due to the different diameters of the tubes receiving the same. Therefore, since the two clamping means between the leg sections 13 and 14, and 12 and 13, are constructed and operate in the same manner, only one clamping means will be specifically described.

In the upper end of each of the telescoping sections 13 and 14 there is fixed a conical screw 30 having a flange 31 extending therefrom. This screw may be fixed in the upper end of the leg section by having a shank 32 thereon driven into the open end of the tube until the flange 31 rests upon the upper end of the leg section. To be sure that this screw will not rotate relative to the leg section into which it is driven, the shank 32 may be provided with a longitudinal knurling, as indicated, which will cut into the inner wall of the leg section. The flange 31 overhangs the bushing 19, or 20, as the case may be, to positively prevent the leg section from being pulled out of the leg section with which it telescopes.

Surrounding the conical screw 30, and in threaded engagement therewith, are a plurality of, in this instance two, arcuate clamping sections 33, see Figs. 5 and 6. Each of these arcuate clamping sections has its inner surface tapered correspondingly to the taper of the conical screw and threaded to engage the threads of said screw. The outer surface of these arcuate clamping sections are adapted to engage the inner wall of the leg section within which they telescope and extend longitudinally of said leg section a substantial distance to provide a relatively large frictional clamping area with the inner walls of the tube. These arcuate clamping sections may be conveniently made of a single conical threaded nut to fit the screw and then cut into separate sections on the radius of the nut so formed. Or they may be die cast as individual arcuate clamping sections of the form shown in Fig. 5, and which method of fabrication I have found to be suitable from the standpoint of operation, and the cheapest to produce. While these arcuate clamping sections may be made of any suitable material, I have found that a plastic material, such as Tenite, is very satisfactory both from a standpoint of frictional engagement obtained with a metal wall and from the standpoint of fabrication.

The conical screw 30 is a little longer than the arcuate clamping sections 33 so as to permit a limited longitudinal movement of the screw relative to said sections between a clamping and an unclamping position. The disk 35 is fastened to the upper end of the conical screw in any suitable manner, as by a bolt 36 extending downwardly through the screw and held by a nut 37, to prevent the screw from being retracted a sufficient amount to become disengaged from the arcuate clamping sections. It will be readily understood that if the leg section in which the conical screw is fixed is rotated in one direction, and the arcuate sections are held stationary by friction between them and the inner wall of the leg section they engage, then the screw will move up into the arcuate sections and expand the same against the inner wall of the leg section engaged thereby to firmly clamp the two leg sections against relative longitudinal movement. On the other hand, if the conical screw is rotated in the opposite direction, then the same will be retracted from the arcuate clamping sections and the friction between said sections and the leg section engaged thereby will be reduced to permit the leg sections to be moved longitudinally relative to one another. In Fig. 2, the upper clamping means is shown in an unlocked position, while the lower clamping means is shown in a clamping position.

Referring particularly to Figs. 3 and 4 wherein the conical screw is shown in clamping and unclamping positions, respectively, it will be noticed that the threads on the screw and arcuate sections are square. While this construction is not imperative it is desirable because the actual wedging action between the screw and the arcuate clamping sections comes between the face of the threads on one part and the base of the threads on the other part. When the screw threads are square, as shown, the spreading force is a single force acting radially of the inner leg section instead of being broken into two forces only one of which would be radially of the leg sections in the event pointed threads were used on the screw and arcuate clamping sections. It will also be noticed by reference to Figs. 3 and 4 that the spreading action of the screw on the arcuate clamping section is transmitted the full length of the sections, rather than at a point at the bottom only, as would be the case where the tapered portions of a wedge did not fit the clamping member throughout its length, with the result that a maximum frictional resistance is set up between the clamping sections and the inner wall of the leg section engaged thereby with the least amount of manual force. Referring to Figs. 3 and 4 it will be appreciated that the threaded engagement between the conical screw and the clamping sections need not be perfect, because only one face of the thread on the conical screw, the lower face, actually engages the thread on the clamping sections to give the desired relative longitudinal movement of the two when the screw is rotated. It need not be specifically pointed out that the threads on the conical screw and clamping sections should be of such depth that the two will not become disengaged when the parts are moved into an unclamping position, see Fig. 4, in which case the two could be moved longitudinally relative to each other without rotation of one or the other.

In order that the clamping means will take effect immediately upon rotation of the leg sections having the conical screw fixed thereto, it is imperative that the arcuate clamping sections 33 remain stationary when the conical screw starts to turn. In addition, it is extremely desirable that there be sufficient friction between the two telescoping leg sections when the same are not clamped together to prevent uncontrolled extension of the legs when the tripod is picked up or is being carried. To these two ends each arcuate clamping section 33 is provided with a groove 40 extending circumferentially on the inner face of the section and having its bottom spaced radially of the bottom of a thread in the section for a purpose which will be obvious. The grooves 40 are so situated in each clamping section that when the sections are placed in surrounding relation with the conical screw the grooves will line up to form a spring seat into which the expander spring 41, see Fig. 7, can be seated, as clearly shown in Figs. 3, 4, and 6. It will be noticed that the spring, due to the depth of the grooves 40, does not extend into the threads of the clamping section to interfere in any way with the threaded engagement between said sections and the conical screw. This expander spring 41 serves two purposes. First, it normally forces the arcuate clamping sections 33 into frictional engagement with the inner wall of the leg section within which they extend to prevent the two leg sections from telescoping relative to one another in an uncontrolled manner when the clamping means is not set; and secondly, it sets up sufficient friction between the clamping sections and the leg section engaged thereby to hold said sections against rotation while the conical screw is turned relative thereto to effect a clamping of the leg sections.

While I have shown and described the conical screw 30 as if it were machined, it will be readily understood that the same could be die cast to reduce the cost of its fabrication. If the screw were die cast, then the stop disk 35 could be cast on the top thereof rather than being a separate piece held on by the bolt 36 as shown. In the event the screw were die cast the flow lines caused at the joint of the die could be milled off, or the blank could be formed with flats to be located at the joints of the die, so that the flow marks customary in die-casting operations would not interfere with the threaded engagement between the screw and clamping sections. The clamping sections 33 can be die cast as well as machined, as set forth above, which contributes to the provision of a tripod leg clamping means which is simple and inexpensive, but at the same time not possessing the enumerated disadvantages of similar structures of the prior art.

By reason of the simple nature of the described tripod leg clamping means the assembly of these legs is very simple. Referring to Fig. 2, the leg section 13 is assembled in the leg section 12 from the top before the ball member 17 is screwed into the top of the leg section. The leg section 14 is inserted into the lower end of the leg section 13 while the collar 21 and bushing 20 are removed, after which said collar with the bushing 21 is screwed onto the threaded lower end of the leg section 13. In each instance, the arcuate clamping sections 33 are placed in encircling relation to the conical screw with the expander spring 41 in place in grooves 40, said clamping sections being forced toward the screw against the action of said spring until the sections are inserted within the leg section within which they are to be confined.

It is believed that the advantages of the present tripod leg clamping means over similar structures of the prior art will be obvious from the above description of the same so that they need not be specifically enumerated at this point. It will suffice to say that this clamping means provides a cheap tripod leg which has all the advantages of more expensive legs while at the same time possessing advantages not possessed by said other legs such as, tighter clamping action with a given force applied, constant frictional retard against uncontrolled extension of the leg sections when unclamped, and an immediately effective clamping action the instant one leg section is turned relative to the other in the proper direction.

Although I have shown and described certain specific embodiments of my invention, I am fully aware that many modifications of the same are possible. My invention, therefore, is not to be restricted except insofar as necessitated by the spirit of the appended claims.

Having thus described my invention, what I claim as new and desire to secure by Letters Patent of the United States is:

1. In a tripod leg, the combination with a hollow leg member, a second leg member longitudinally and rotatably movable within said hollow leg member, a conical screw fixed to the end of said second leg member within said hollow leg member and spaced from the inner walls of said hollow leg member, a split-nut comprising a plurality of separate arcuate sections located around said screw and confined between the same and the inner walls of said hollow leg member, the inner face of each of said sections being tapered and threaded to threadedly engage the threads on said screw, and the outer face of each section being complementary in shape to the inner wall of said hollow leg member and adapted to frictionally engage the same, a pair of spaced stops on said screw adapted to engage opposite ends of said nut when the screw is moved longitudinally relative thereto to permit a limited relative longitudinal movement between said screw and said sections, whereby the sections are adapted to be wedged between the screw and the inner wall of said hollow leg member when said second leg member is rotated in one direction relative to said hollow leg member, and are adapted to be positively prevented from becoming disengaged from said screw when said second leg member is rotated in the other direction relative to said hollow leg member to release the wedging action on said sections.

2. In a tripod leg, the combination with a hollow leg member, a second leg member longitudinally and rotatably movable within said hollow leg member, a conical screw fixed to the end of said second leg member within said hollow leg member, a split-nut comprising a plurality of separate arcuate sections each having a tapered inner surface threaded to engage said screw and having an outer contour complementary to and adapted to frictionally engage the inner wall of said hollow leg member, whereby rotation of said second leg member will effect an expansion of said split-nut to clamp said leg members against relative longitudinal movement, means normally forcing each of said arcuate sections into frictional engagement with the inner walls of said hollow leg member without removing the same from threaded engagement with said screw, and means movable with said second leg member adapted to cooperate with said split-nut when said second leg member is rotated in the other direction to prevent the screw and nut from becoming disengaged.

3. In a tripod leg, the combination with a hollow leg member, a second leg member longitudinally and rotatably movable within said hollow leg member, a conical screw fixed to the end of said second leg member within said hollow leg member, a split-nut comprising a plurality of separate arcuate sections each having a tapered inner surface threaded to engage said screw and having an outer contour complementary to and adapted to frictionally engage the inner wall of said hollow leg member, a spring normally forcing each of said arcuate sections laterally of, and into frictional engagement with, the inner wall of said hollow leg member without removing the same from threaded engagement with said screw, and means movable with said screw and adapted to cooperate with said split-nut when the two are moved relative to one another for permitting a relative longitudinal movement between said sections and said screw, whereby the sections are adapted to be moved into clamping engagement with the inner wall of said hollow leg member when said second leg member is rotated in one direction relative to said hollow member, but the screw and nut are positively prevented from becoming disengaged when said second leg member is rotated in the other direction relative to said hollow member.

4. In a tripod leg, the combination with a hollow leg member, a second leg member longitudinally and rotatably movable within said hollow leg member, a conical screw fixed to the end of said second leg member within said hollow leg member, a split-nut comprising a plurality of separate arcuate sections each having a tapered inner surface threaded to engage said screw and having an outer contour complementary to and adapted to frictionally engage, the inner wall of said hollow leg member, the tapered face of each of said sections provided with a groove extending transversely of the section from one end thereof to the other, said grooves so located in each section as to be brought into alignment with one another when the sections are assembled around said screw to form a spring seat, an expander spring encircling said screw and seated in said spring seat normally acting to force said sections transversely of, and into frictional engagement with, the inner wall of said hollow leg member without removing the same from threaded engagement with said screw, and means movable with said screw and adapted to cooperate with said split-nut when the two are moved relative to one another for permitting a relative longitudinal movement between said sections and said screw, whereby the sections are adapted to be moved into clamping engagement with the inner wall of said hollow leg member when said second leg member is rotated in one direction relative to said hollow leg member, but the screw and nut are positively prevented from becoming disengaged when said second leg member is rotated in the other direction relative to said hollow member.

5. In a tripod leg, the combination with a hollow leg member, a second leg member longitudinally and rotatably mounted within said hollow leg member, a conical screw fixed to the end of said second leg member within said hollow leg member, a split-nut having an outer contour adapted to frictionally engage the inner wall of said hollow member and having a conical threaded bore adapted to threadedly engage said conical screw whereby rotation of said second leg member in one direction relative to said hollow leg member will effect an expansion of said split-nut to clamp said leg members against relative longitudinal movement, and means movable with said second leg member adapted to cooperate with said split-nut when said second leg member is rotated in the other direction to prevent the screw and nut from becoming disengaged.

6. In a tripod leg, the combination with a hollow leg member, a second leg member longitudinally and rotatably mounted within said hollow leg member, a conical screw fixed to the end of said second leg member within said hollow leg member, a split-nut comprising a plurality of separate arcuate sections each having an outer contour complementary to and adapted to frictionally engage the inner wall of said hollow leg member and each having a tapered inner surface threaded to engage said screw, whereby rotation of said second leg member in one direction relative to said hollow leg member will effect an expansion of said split-nut to clamp said leg members against relative longitudinal movement; and means on said screw adapted to engage said split-nut when said second leg member is rotated in the other direction to prevent the screw and nut from becoming disengaged.

HENRY J. HOOD.